United States Patent
Kao et al.

(10) Patent No.: US 10,216,937 B2
(45) Date of Patent: Feb. 26, 2019

(54) SECURE BIOS PASSWORD METHOD IN SERVER COMPUTER

(71) Applicant: Hewlett Packard Enterprise Development LP, Houston, TX (US)

(72) Inventors: Liang-Chin Kao, Taipei (TW); Shang-Ching Hung, Taipei (TW); Hao Lun Chin, Taipei (TW)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 233 days.

(21) Appl. No.: 15/325,299

(22) PCT Filed: Jul. 31, 2014

(86) PCT No.: PCT/US2014/049232
§ 371 (c)(1),
(2) Date: Jan. 10, 2017

(87) PCT Pub. No.: WO2016/018390
PCT Pub. Date: Feb. 4, 2016

(65) Prior Publication Data
US 2017/0185780 A1    Jun. 29, 2017

(51) Int. Cl.
*H04L 29/06* (2006.01)
*G06F 21/57* (2013.01)
*G06F 21/46* (2013.01)

(52) U.S. Cl.
CPC ............ *G06F 21/572* (2013.01); *G06F 21/46* (2013.01); *G06F 21/575* (2013.01);
(Continued)

(58) Field of Classification Search
CPC .................................................. G06F 21/572
See application file for complete search history.

(56) References Cited

U.S. PATENT DOCUMENTS

| 7,619,544 B2 | 11/2009 | Piwonka et al. |
| 8,181,235 B2 | 5/2012 | Miyazaki |

(Continued)

FOREIGN PATENT DOCUMENTS

JP    2013161210    8/2013

OTHER PUBLICATIONS

Wang, Jiang. Hardware-assisted protection and isolation. Diss. 2011. (Year: 2011).*

(Continued)

*Primary Examiner* — Shawnchoy Rahman
(74) *Attorney, Agent, or Firm* — Hewlett Packard Enterprise Patent Department

(57) ABSTRACT

A method for securing BIOS passwords in a server computer under a BIOS user privilege control operation is disclosed. Said method comprises: a BIOS (Basic Input/Output System) of the server computer requesting a BMC (Baseboard Management Controller) to enter a password authentication mode for user privilege authentication; the BMC receiving passwords inputted by a user and comparing the inputted passwords with valid passwords, wherein the valid passwords are stored in the BMC; the BMC deciding an authentication result after the comparing the inputted passwords with the stored valid passwords and saving the authentication result; and the BMC exiting the password authentication mode and notifying the BIOS of the authentication result; wherein the BMC passes fake scan codes of key strings of the inputted passwords to the BIOS, such that the BIOS does not have access to the actual passwords.

16 Claims, 8 Drawing Sheets

(52) U.S. Cl.
CPC .......... *H04L 63/083* (2013.01); *H04L 63/102* (2013.01); *G06F 2221/034* (2013.01)

(56) References Cited

U.S. PATENT DOCUMENTS

| | | |
|---|---|---|
| 8,219,792 B2 | 7/2012 | Jaber et al. |
| 2004/0268140 A1 | 12/2004 | Zimmer |
| 2007/0130481 A1* | 6/2007 | Takahashi ............... G06F 21/41 |
| | | 713/300 |
| 2008/0162956 A1 | 7/2008 | Bozek |
| 2011/0083003 A1 | 4/2011 | Jaber |
| 2012/0079282 A1* | 3/2012 | Lowenstein ............ G06F 21/82 |
| | | 713/189 |
| 2012/0131319 A1* | 5/2012 | Peng ........................ G06F 21/31 |
| | | 713/2 |
| 2013/0019281 A1 | 1/2013 | Jacobs et al. |
| 2013/0091260 A1 | 4/2013 | Murphy |

OTHER PUBLICATIONS

Frykholm, Niklas, and Ari Juels. "Error-tolerant password recovery." Proceedings of the 8th ACM conference on Computer and Communications Security. ACM, 2001. (Year: 2001).*

International Searching Authority, The International Search Report and the Written Opinion, PCT/US2014/049232, dated Apr. 9, 2015, 9 Pgs.

Kuan-Jen Lin, "Using TPM to Improve Boot Security at BIOS Layer," Jan. 13-16, 2012, http://ieeexplore.ieee.org/stamp/stamp.jsp?arnurnber=6161909 > On pp. 376-377.

* cited by examiner

SECURE BIOS PASSWORD METHOD IN SERVER COMPUTER

TECHNICAL FIELD

The present application relates to user privilege control operations. In particular, the present application relates to methods and systems for securing Basic Input/Output System (BIOS) passwords in a server computer under user privilege control operations, and the server computer thereof.

BACKGROUND

In a server computer, the traditional BIOS User Privilege Control operation runs on a system processor, which uses BIOS to perform user authentications. BIOS User Privilege Control comprises User Privilege and User Authentication. User privilege can be read from Non-volatile random-access memory (NVRAM) or written to NVRAM by BIOS. User Authentication depends on saved User Privilege.

In traditional methods, BIOS reads the valid passwords from an NVRAM and the user inputs the passwords from a keyboard. The passwords may be a single string of a password or a list of passwords. The BIOS compares the inputted passwords with the valid passwords. When the user changes the passwords, the BIOS saves the new passwords and sets the user privilege on the BIOS NVRAM.

Such traditional methods handle the user privilege in an unsecured way due to the lack of anti-spy mechanism or encryption over the network. Any spy software may crack the BIOS passwords and then get power on or administration privileges, such that the hacker may obtain the control privilege of a server computer. In a server group, which uses one global set of passwords for all server computers, if the hacker steals the passwords from a server computer in the server group, he/she can then obtain the control privilege of all of the server computers in the group and steal any data in the whole group.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the disclosed embodiments.

DETAILED DESCRIPTION

As described above, the traditional BIOS User Privilege Control operation applies an unsecured method to handle the user privilege for the password authentication, such that a hacker may easily obtain the control privilege of server computers. The present invention aims to solve the aforesaid issue and provides a different structure over the traditional methods in order to avoid that the BIOS passwords and the control privilege of the server computers being hacked.

The present application proposes methods and systems for securing BIOS passwords in a server computer under user privilege control operations. According to the present invention, the BIOS, system processor and system memory cannot access the actual passwords, so the spy software has no chance to discover the BIOS passwords. According to the present invention, the hacker cannot steal the passwords with any cracking methods, such as applying unauthorized applications or unauthorized option ROM (Read-Only Memory), to read the passwords from the BIOS NVRAM storage.

The proposed invention handles the BIOS User Privilege Control operation by a BMC firmware running in a baseboard management controller (BMC) instead of a BIOS firmware running in a system processor of a server computer. From the hardware's aspect, the proposed invention comprises a server computer system with a BMC. From the firmware's aspect, the proposed invention comprises BIOS, BMC firmware and option ROM, which supports the Human Interface Infrastructure (HII) Configuration. The passwords are stored by the BMC, so the BIOS does not need to keep, save or compare them.

Figure 1A:
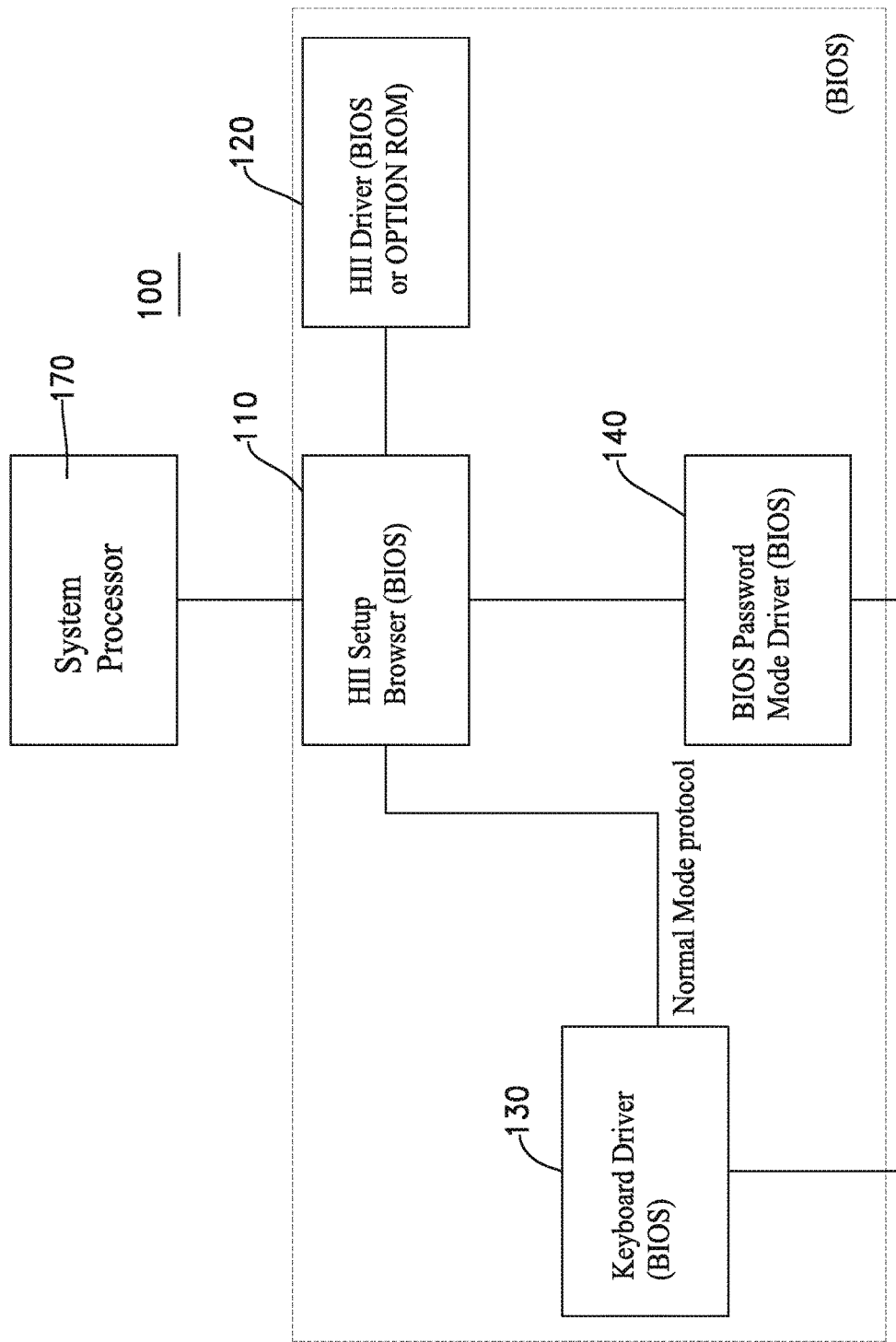
FIGS. 1A and 1B illustrate a block diagram of the firmware components for user privilege authentication in a server computer.
Figure 1B:
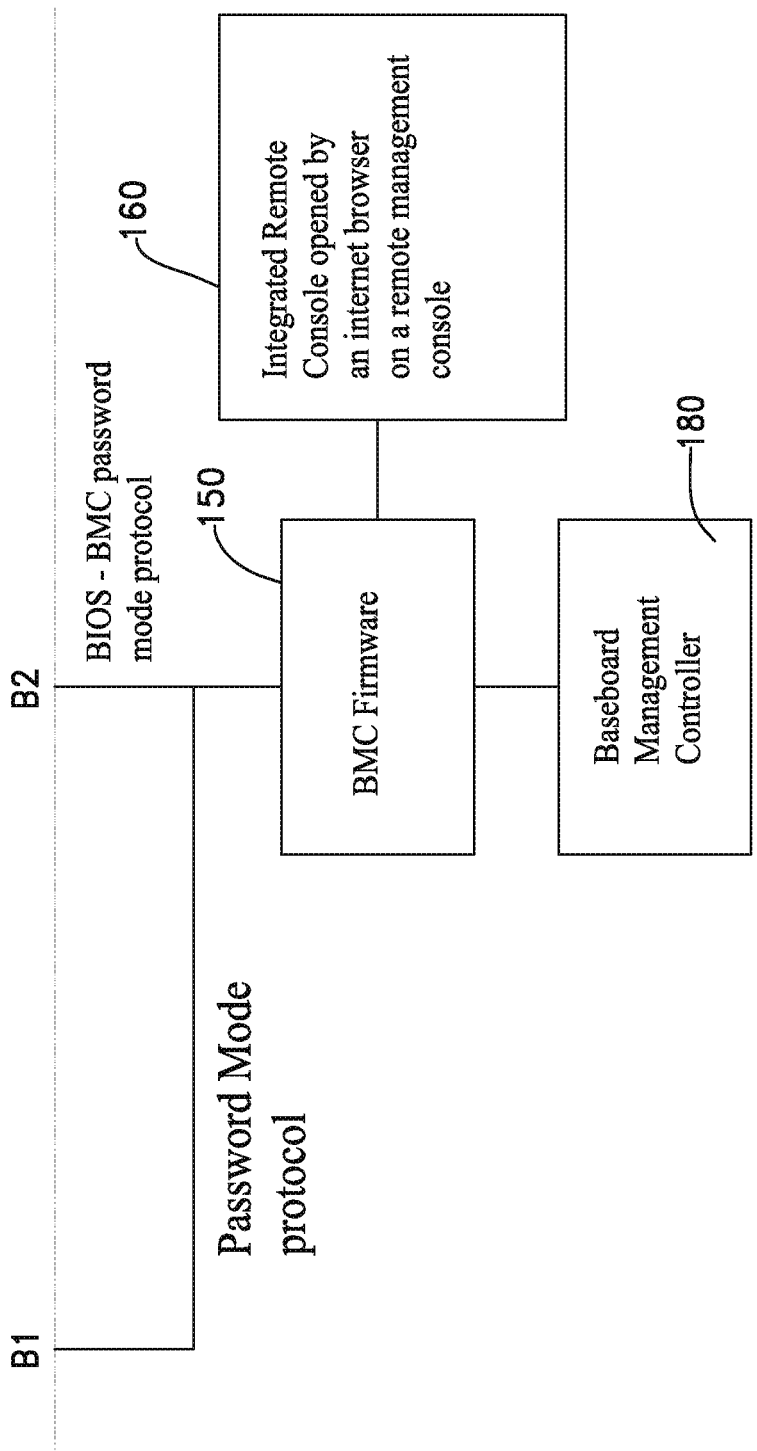

FIG. 1 illustrates a block diagram (100) of software components of BIOS, BMC firmware (150) and option ROM under user privilege operation mode (password mode). The BIOS loads an HII configuration driver (120) embedded in the BIOS or the option ROM, The HII configuration driver (120) provides an interface between the BIOS and the input devices controlled by a user, and communicates activities initiated by the user. The HII configuration driver (120) initiates an HII setup browser (110), which provides the user with a visual browser including system setup options, and enables a keyboard driver (130) for the user to input instructions in order to check whether the user requests a BIOS user privilege control operation. When the system runs in a normal mode instead of a password mode, the BIOS firmware runs on a system processor (170). However, if the user enters instructions to request a BIOS user privilege control operation, the system will then enter the password mode for user privilege authentication. The BIOS first loads a password mode driver (140) and requests the BMC firmware (150) to enter a password authentication mode for user privilege authentication. The BMC firmware (150) runs on a BMC (180) instead of the system processor (170). The BMC (180) is a specialized microcontroller embedded on a motherboard of a computer, generally a server, which supports the Intelligent Platform Management Interface (IPMI) architecture. The BMC (180) manages the interface between system management software and platform hardware. In the password mode, the keyboard driver (130) redirects keyboard events and scan codes to the BMC firmware (150), such that the BIOS and the system processor (170) do not acquire the actual scan codes and cannot access the actual passwords. The BMC firmware (150) may further comprise a keyboard controller firmware, which processes the keyboard events inputted locally or remotely from an integrated remote console (160).

Under the aforesaid structure, when the user requests the password check operation locally, authentication operation will be handled by the BMC firmware (150) instead of the BIOS firmware running in a system processor of the server computer. When the user requests the password check operation and inputs the passwords remotely from the integrated remote console (160), the inputted passwords sent from the remote console (160) will be encrypted over a network.

Figure 2A:
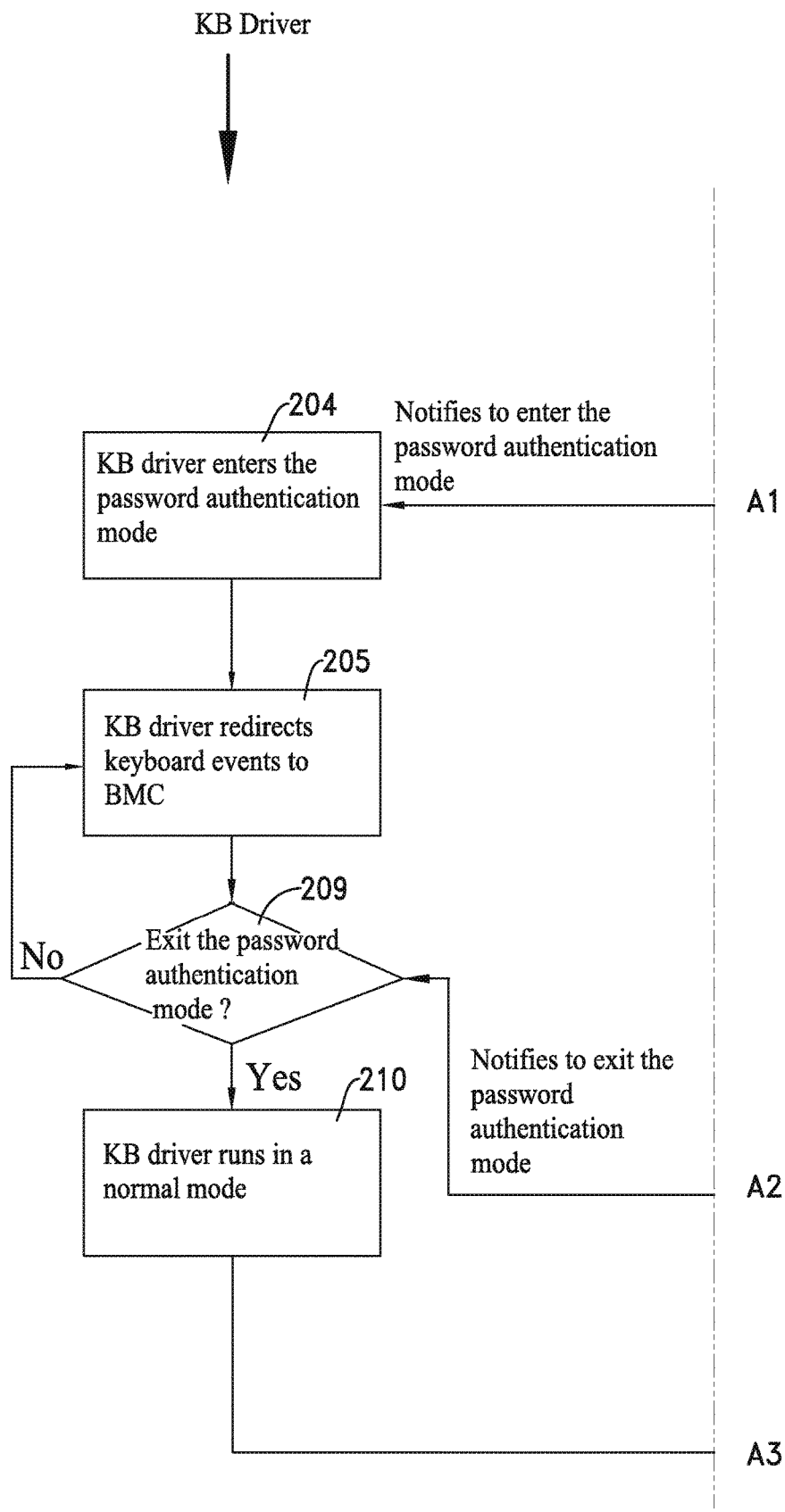
FIGS. 2A to 2C illustrate a flow chart of user privilege authentication.
Figure 2B:
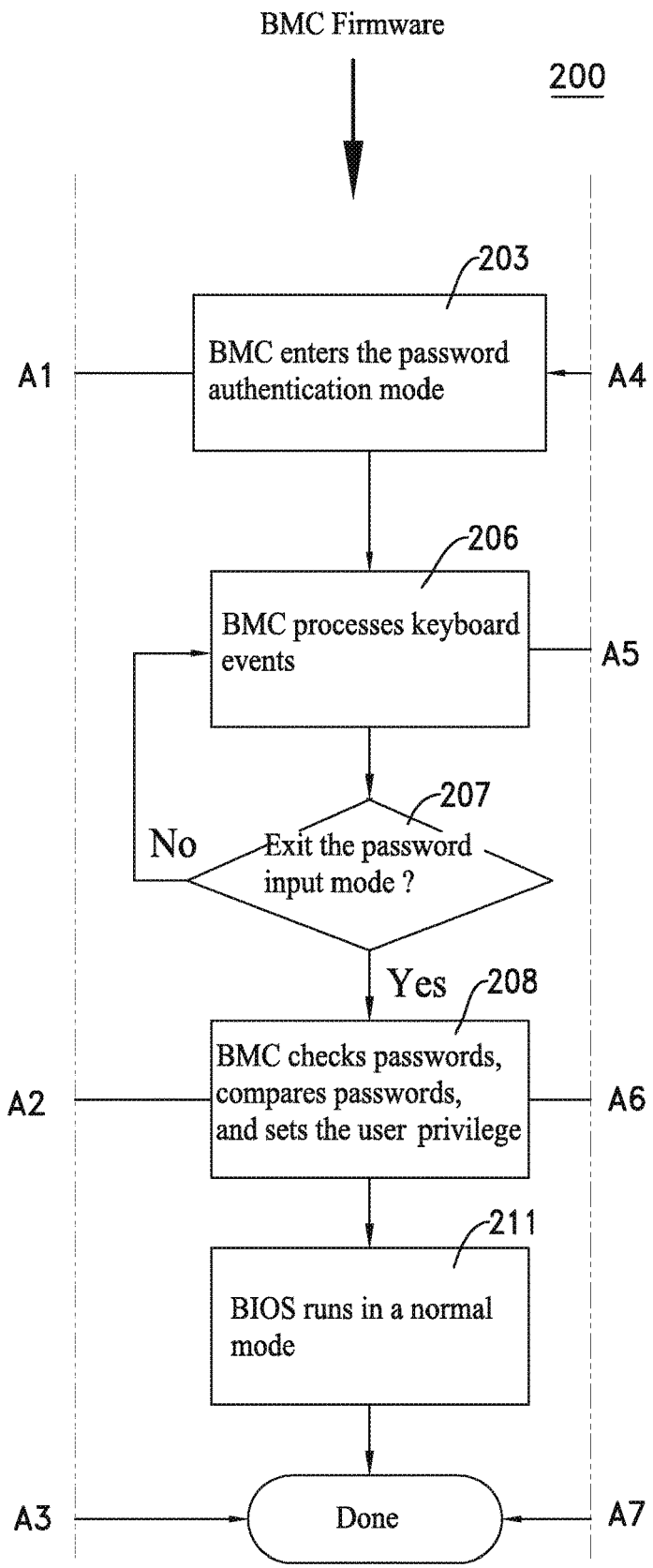
Figure 2C:
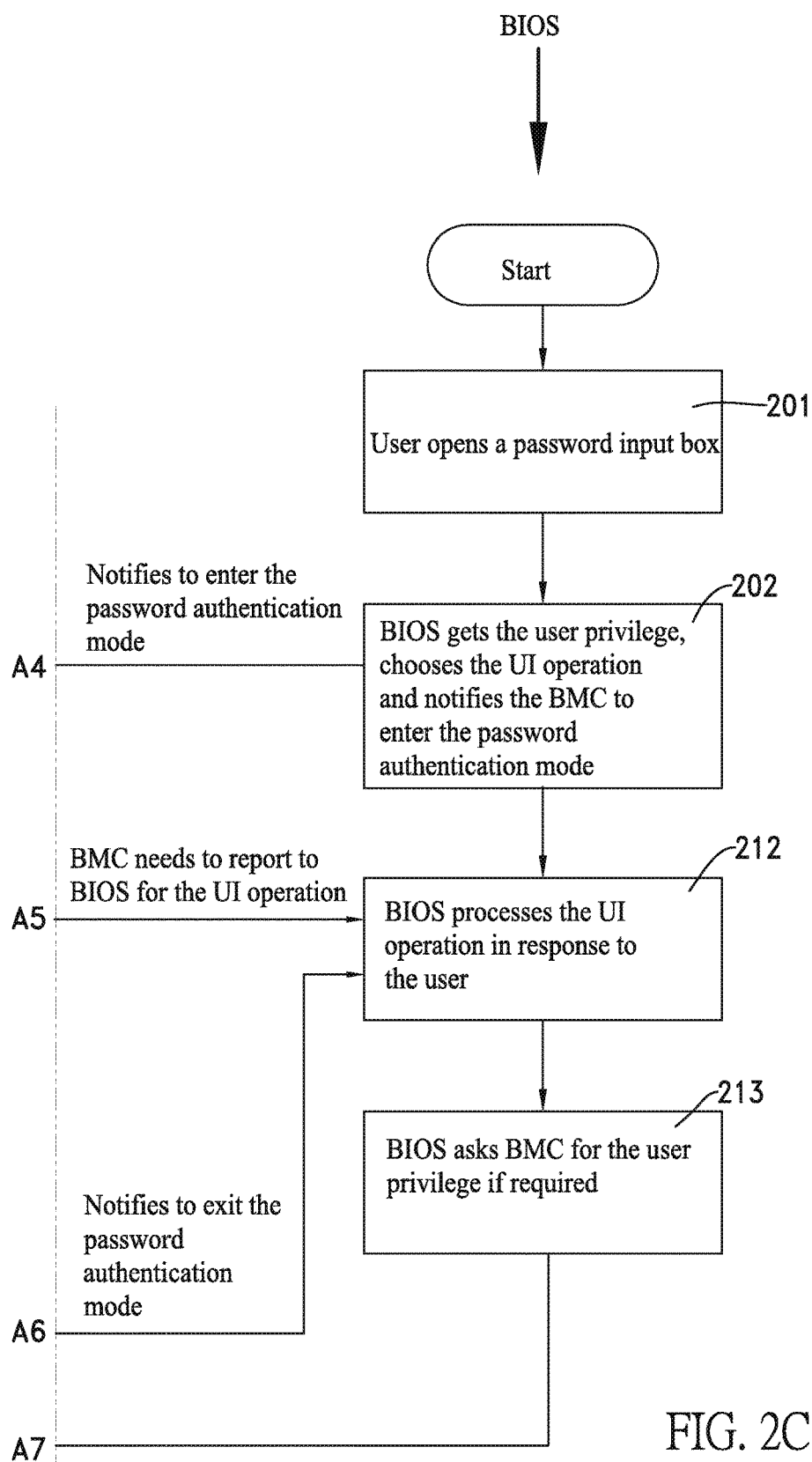

FIG. 2 illustrates a detailed flow chart (200) for the BIOS requesting the BMC firmware to enter a password authentication mode for user privilege authentication. According to the present invention, a user opens the password input box in an HII setup browser (201). The BIOS gets the user's instructions, chooses the UI operation and notifies the BMC to enter a password authentication mode (202). The BMC enters the password authentication mode (203) and notifies the BIOS keyboard driver to also enter a password authentication mode (204). The BIOS keyboard driver enters the password authentication mode and redirects keyboard events to the BMC instead of the BIOS (205). The BMC receives and processes the keyboard events and the scan codes of the inputted strings (206). After the user completes the input of the passwords, the BMC exits the password input mode (207). The BMC checks the passwords inputted by the user, compares the inputted passwords with valid passwords and sets the user privilege (208). The BMC then notifies the BIOS of the authentication result and notifies the BIOS keyboard driver to exit the password authentication mode (208). The BIOS keyboard driver exits the password authentication mode (209) and resumes the normal mode (210). The BMC exits the password authentication mode and runs in the normal mode (211). The BIOS processes the following UI operation in response to the user (212) and may inquire into the user's privilege with the BMC if required (213).

Figure 3:
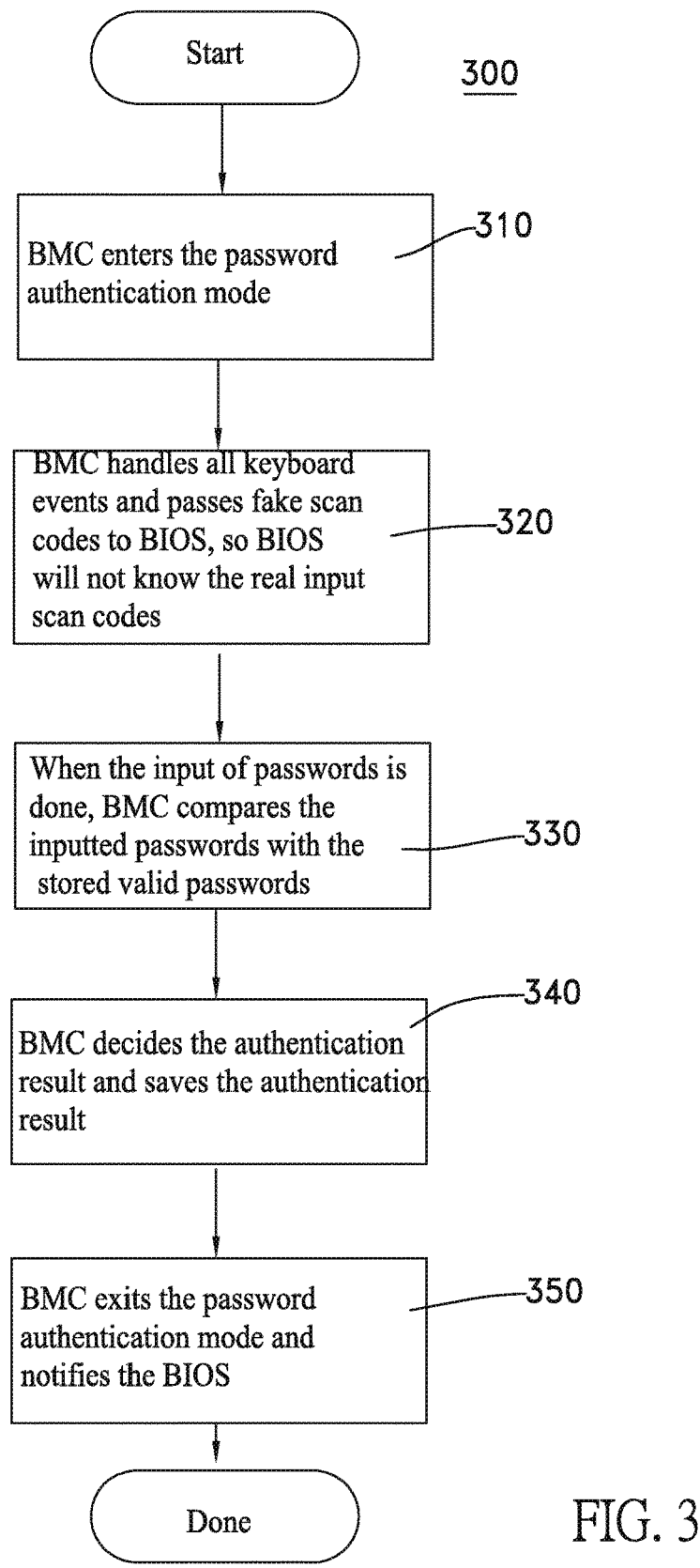
FIG. 3 illustrates a flow chart of user privilege authentication handled by a Baseboard Management Controller (BMC).

FIG. 3 illustrates a flow chart (300) of user privilege authentication handled by a BMC. The method for user privilege authentication can be processed locally by a BMC or remotely from an integrated remote console. The integrated remote console module provided by the BMC can be operated over a network via the integrated remote console. If a user enters instructions for set up user privilege in the BIOS of a server computer, the BIOS requests a BMC to enter a password authentication mode (310). The BMC receives all of the keyboard events and passes fake scan codes to the BIOS, such that the BIOS cannot access the actual input scan codes (320). When the user completes the input of the passwords, the BMC encrypts the passwords and compares the inputted passwords with valid passwords stored in the BMC (330). The BMC decides an authentication result after the aforesaid comparison and saves the authentication result (340). Finally, the BMC exits the password authentication mode and notifies the BIOS of the authentication result (350).

Figure 4:
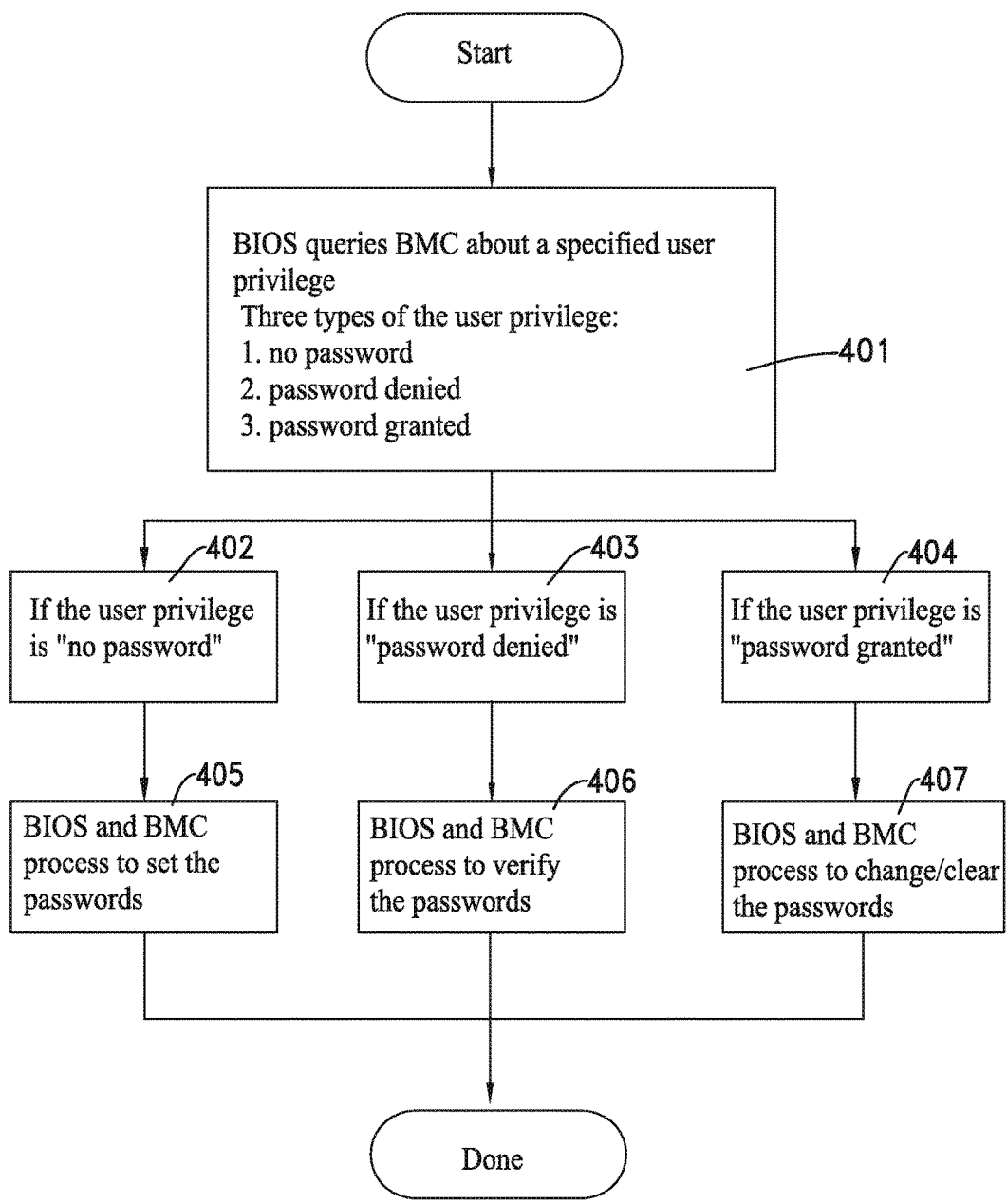
FIG. 4 illustrates a flow chart of three types of user privilege operation.

FIG. 4 illustrates three types of the authentication results under a BIOS user privilege control operation. When the BIOS requests the BMC for user privilege authentication, the BIOS needs to indicate the type of the user privilege to be processed by a unique number, usually a GUID used by the UEFI BIOS. The specified user privilege mechanism provides the option ROM with the ability to process the user privilege authentication. The user privilege can be categorized as one of the followings (for example and not limited to): BIOS power on user privilege; BIOS administrator user privilege; BMC access user privilege; and specified option ROM user privilege. Different privileges provide different authorities for the control of the computer. The BIOS power on user privilege enables an authority for setting a specific time by a user, such that the computer can be automatically powered on at the aforesaid specific time. The BIOS administrator user privilege enables an authority for a user to change the system setup options in the BIOS. The BMC access user privilege enables an authority for a user to access the setting stored in the BMC. The specified option ROM user privilege enables an authority for a user to change the setup options stored in the option ROM. The authentication results (401) under a BIOS user privilege control operation may be "no password", "password denied", or "password granted". If the user privilege is "no password" (402), the BIOS and BMC will process to set up the passwords (405). If the user privilege is "password denied" (403), the BIOS and BMC will process to verify the passwords (406). If the user privilege is "password granted" (404), the BIOS and BMC will process to change or clear the passwords (407).

Figure 5:
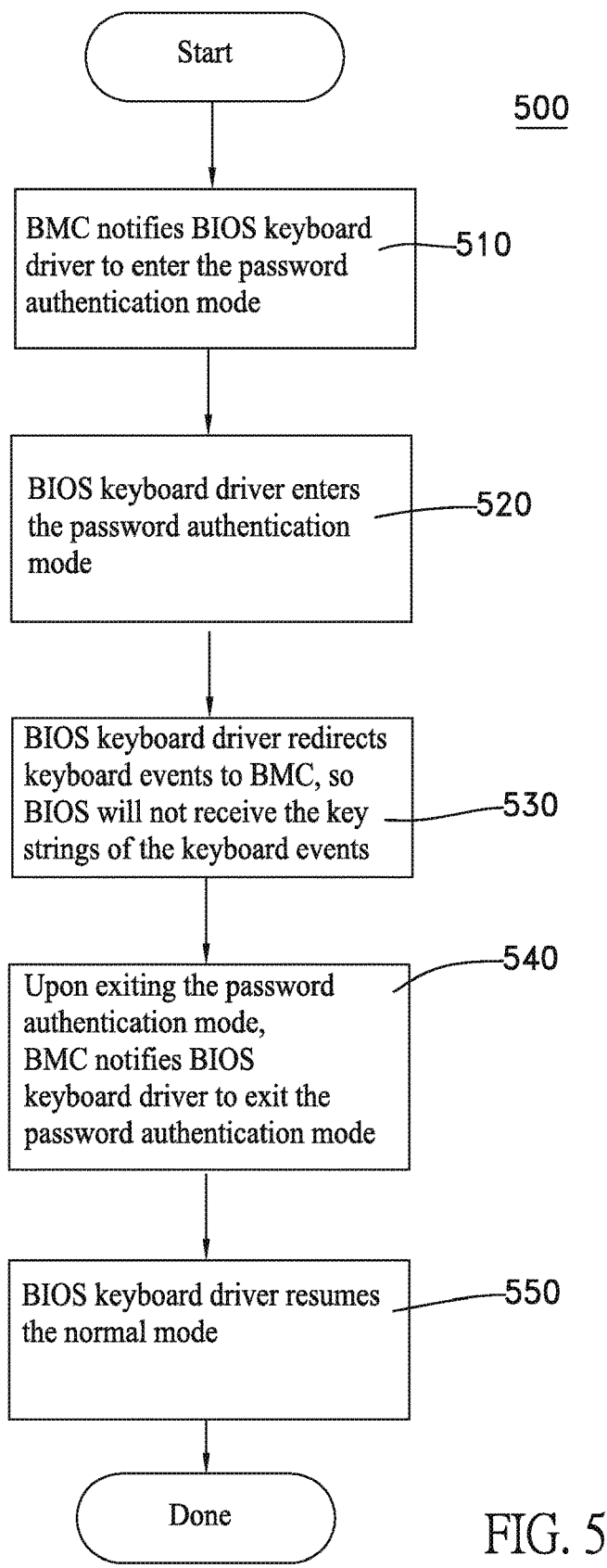
FIG. 5 illustrates a flow chart for the BIOS keyboard driver under user privilege operation mode.

FIG. 5 illustrates a flow chart (500) for the process of the BIOS keyboard driver under user privilege operation mode. According to the present invention, when the BMC enters the password authentication mode, the BMC notifies a BIOS keyboard driver to enter the password authentication mode (510). The BIOS keyboard driver enters the password authentication mode (520) and redirects keyboard events to the BMC instead of the BIOS, such that the BIOS does not receive the key strings of the keyboard events (530). Upon the BMC exiting the password authentication mode, the BMC notifies the BIOS keyboard driver to exit the password authentication mode (540). The BIOS keyboard driver then resumes the normal mode (550).

According to the illustrated operations for BIOS user privilege authentication, any server computers and systems including the disclosed functionality of the BIOS and BMC may also secure the BIOS passwords and are also claimed by the present application. According to the present invention, BIOS, system processor and system memory cannot access the actual passwords, so the spy software has no chance to discover the BIOS passwords. According to the present invention, the hacker cannot steal the passwords with any codecrack methods, such as applying unauthorized applications or unauthorized option ROM, to read the passwords from the BIOS NVRAM storage. Accordingly, the present invention secures the user privilege for server computers and systems.

The aforesaid detailed descriptions illustrate the preferred embodiments of the present application. However, the scope of the claimed invention should not be limited by any of the above-described exemplary embodiments, but should be defined only in accordance with the following claims and their equivalents.

What is claimed is:

1. A method for securing Basic Input/Output System (BIOS) passwords in a server computer under a BIOS user privilege control operation, comprising:
   requesting a Baseboard Management Controller (BMC) to enter a password authentication mode for user privilege authentication;
   receiving passwords inputted by a user and comparing the inputted passwords with valid passwords by the BMC, wherein the valid passwords are stored in the BMC;
   deciding an authentication result by the BMC after the comparing the inputted passwords with the stored valid passwords, and saving the authentication result into the BMC; and
   exiting the password authentication mode for the BMC and notifying the BIOS of the authentication result by the BMC;
   wherein the BMC passes fake scan codes of key strings of the inputted passwords to the BIOS, such that the BIOS cannot access the actual passwords.

2. The method of claim 1, wherein the BMC processes the user privilege authentication locally when the user uses a local keyboard or remotely when the user performs a password check operation over a network from a remote console.

3. The method of claim 2, wherein the inputted passwords sent from the remote console over a network are encrypted.

4. The method of claim 1, wherein the authentication result comprises: no password; password denied; or password granted.

5. The method of claim 1, further comprising:
notifying a BIOS keyboard driver to enter the password authentication mode from a normal mode;
entering the password authentication mode for the BIOS keyboard driver and redirecting keyboard events to the BMC instead of the BIOS, such that the BIOS does not receive the key strings of the keyboard events;
upon exiting the password authentication mode for the BMC, notifying the BIOS keyboard driver to exit the password authentication mode by the BMC; and
resuming the normal mode for the BIOS keyboard driver.

6. A system for securing Basic Input/Output System (BIOS) passwords in a server computer under a BIOS user privilege control operation, comprising:
a BIOS including a Human Interface Infrastructure (HII) configuration driver, wherein the BIOS loads the HII configuration driver to check whether a user requests the BIOS user privilege control operation; and
a Baseboard Management Controller (BMC) embedded in the server computer, the BMC receiving a request from the BIOS to enter a password authentication mode when the user requests the BIOS user privilege control operation;
wherein the BMC receives passwords inputted by a user and compares the inputted passwords with valid passwords after entering the password authentication mode, the valid passwords are stored in the BMC, and the BMC passes fake scan codes of key strings of the inputted passwords to the BIOS, such that the BIOS cannot access the actual passwords,
the BMC decides an authentication result after the comparing the inputted passwords with the stored valid passwords and saves the authentication result, and
the BMC exits the password authentication mode and notifies the BIOS of the authentication result.

7. The system of claim 6, wherein the BMC processes the user privilege authentication locally when the user uses a local keyboard or remotely when the user performs a password check operation over a network from a remote console.

8. The system of claim 7, wherein the inputted passwords sent from the remote console over a network are encrypted.

9. The system of claim 6, wherein the authentication result comprises: no password; password denied; or password granted.

10. The system of claim 6, wherein the BIOS further comprises a BIOS keyboard driver, and the BMC notifies the BIOS keyboard driver to enter the password authentication mode from a normal mode;
the BIOS keyboard driver enters the password authentication mode and redirects keyboard events to the BMC instead of the BIOS, such that the BIOS does not receive the key strings of the keyboard events;
upon the BMC exiting the password authentication mode, the BMC notifies the BIOS keyboard driver to exit the password authentication mode; and
the BIOS keyboard driver resumes the normal mode.

11. The system of claim 6, wherein the server computer is included in the system and comprises a storage device storing the BIOS.

12. A non-transitory computer-readable storage medium storing instructions for executing a method for securing Basic Input/Output System (BIOS) passwords in a server computer under a BIOS user privilege control operation, when the instructions are executed by the server computer, cause the server computer to:
requesting a Baseboard Management Controller (BMC) to enter a password authentication mode for user privilege authentication;
receiving passwords inputted by a user and comparing the inputted passwords with valid passwords by the BMC, wherein the valid passwords are stored in the BMC;
deciding an authentication result by the BMC after the comparing the inputted passwords with the stored valid passwords, and saving the authentication result into the BMC; and
exiting the password authentication mode for the BMC and notifying the BIOS of the authentication result by the BMC;
wherein the BMC passes fake scan codes of key strings of the inputted passwords to the BIOS, such that the BIOS cannot access the actual passwords.

13. The non-transitory computer-readable storage medium of claim 12, wherein the BMC processes the user privilege authentication locally when the user uses a local keyboard or remotely when the user performs a password check operation over a network from a remote console.

14. The non-transitory computer-readable storage medium of claim 13, wherein the inputted passwords sent from the remote console over a network are encrypted.

15. The non-transitory computer-readable storage medium of claim 12, wherein the authentication result comprises: no password; password denied; or password granted.

16. The non-transitory computer-readable storage medium of claim 12, further cause the server computer to:
notifying a BIOS keyboard driver to enter the password authentication mode from a normal mode;
entering the password authentication mode for the BIOS keyboard driver and redirecting keyboard events to the BMC instead of the BIOS, such that the BIOS does not receive the key strings of the keyboard events;
upon exiting the password authentication mode for the BMC, notifying the BIOS keyboard driver to exit the password authentication mode by the BMC; and
resuming the normal mode for the BIOS keyboard driver.

* * * * *